United States Patent

Larsen

[15] 3,699,241

[45] Oct. 17, 1972

[54] COLOR TELEVISION SYSTEM WITH AUTOMATIC CORRECTION OF CHROMA AMPLITUDES

[72] Inventor: Arthur Bertel Larsen, Colts Neck, N.J.

[73] Assignee: Bell Telephone Laboratories, Incorporated, Murray Hill, N.J.

[22] Filed: Jan. 6, 1971

[21] Appl. No.: 104,412

[52] U.S. Cl.......178/5.4 AC, 178/5.4 ST, 178/5.4 TC

[51] Int. Cl.............................H04n 9/04, H04n 9/48

[58] Field of Search.........178/5.4 R, 5.4 ST, 5.4 AC, 178/5.4 TC, 5.2 A, 5.2 R

[56] References Cited

UNITED STATES PATENTS

| | | | |
|---|---|---|---|
| 2,969,424 | 1/1961 | Tait | 178/5.4 TC |
| 2,945,086 | 7/1960 | Taylor | 178/5.4 R |
| 3,107,275 | 10/1963 | Chatten | 178/5.4 AC |
| 3,541,237 | 11/1970 | Dillenburger | 178/5.4 AC |
| 3,627,911 | 12/1971 | Kubota et al. | 178/5.4 AC |

FOREIGN PATENTS OR APPLICATIONS

| | | | |
|---|---|---|---|
| 1,947,429 | 5/1970 | Germany | 178/5.4 AC |

*Primary Examiner*—Robert L. Richardson
*Attorney*—R. J. Guenther and E. W. Adams, Jr.

[57] ABSTRACT

The low frequency portion of a color camera output signal is monitored and used to correct the carrier-borne color components of the composite output. The inherent redundancy of four independent video components provides the monitoring capability. A suggested embodiment utilizes a true low frequency luminance signal and the three carrier-borne color components (preferably red, green and blue). These components are detected and the resulting baseband signals are combined to yield a derived luminance signal. Comparison of the true and derived luminance produces a control signal which is fed back to vary the common factor by which all of the color components are amplified. In this manner compensation is provided for degradation of the carrier frequency (color) components, such as may be caused by loss of resolution of the camera tube or high frequency roll-off of a transmission link.

9 Claims, 2 Drawing Figures

INVENTOR
A. B. LARSEN
BY David L. Hurewitz
ATTORNEY

COLOR TELEVISION SYSTEM WITH AUTOMATIC CORRECTION OF CHROMA AMPLITUDES

BACKGROUND OF THE INVENTION

This invention relates to color television systems, and more particularly, to correction apparatus for automatically controlling the amplitudes of color signals, especially in systems having a single-tube camera and utilizing striped color filters to form on the single target optically modulated color images.

As is well known, transmission of a color representation of a scene requires at least three independent video signals. One class of simple color cameras employs a single camera tube, and a representative type is disclosed in U.S. Pat. No. 2,733,291, issued Jan. 31, 1956 to R. D. Kell. The Kell camera employs vertically positioned striped color filters or gratings to spatially modulate two primary color images (such as red and blue) onto the target. The scanning of the spatially modulated images produces modulated electrical carriers, each carrier containing the information corresponding to a single primary color image. One modulated carrier will be produced for each striped filter. The Kell camera produces two electrical carriers, and the striped filters are assembled so that the two carriers are separated in frequency. As used herein, an image is spatially modulated by being passed through a striped optical filter and the frequency of spatial modulation is determined by the filter's density or spatial frequency which is proportional to the number of stripes per unit length orthogonal to the stripes.

Additional filters can be used to provide a greater number of modulated carriers. The filters can also be arranged to produce frequency interleaved carriers in lieu of the frequency separated carriers in the Kell type system. This latter system is disclosed, for example, in a copending application of the present inventor, Ser. No. 7501, filed Feb. 2, 1970.

In color video systems, the amplitudes of the color signals are functions of numerous system characteristics. One disadvantage of the spatially modulated systems is that variations in camera tube resolution cause corresponding variations in the chrominance or color characteristics of the reconstructed image due primarily to the effects on the high frequency modulated color signals. Even in those systems where resolution affects all colors equally, changes in resolution cause variations in the amplitudes of the color components which are manifested as distortion in the displayed color image. In addition, high frequency roll-off of a transmission system will produce signal degradation.

The prior art provides numerous correction schemes for overcoming transmission degradation of color signals. Most conventionally, the color burst signal or the burst and sync signals are used as a reference to control amplification of the color components, but these systems are inherently incapable of correcting for variations of video signals due to variations of camera tube resolution since neither the burst nor sync signals are representative of camera performance. Many of the correction techniques utilize matrixing to add a common luminance signal to each color component, but the matrixing distorts the saturation of the resultant output signals.

In certain television applications, such as PICTUREPHONE visual telephone, where economy requires that a single-tube camera be utilized, automatic correction of the variations in the amplitudes of the modulated color carriers caused by variations in tube resolution are highly desirable. The existing correction techniques cannot achieve the desired results. The transmission correction methods do not respond at all to resolution variations, and the matrixing correction introduces an undesirable saturation error by adding equal amplitudes to all of the color components, thus producing a distortion of their relative amplitudes.

SUMMARY OF THE INVENTION

In accordance with the present invention, an improvement in three carrier systems can be obtained by using the low-frequency portion of the baseband signal (which is superfluous as far as color information is concerned) as a check on the system response at the frequency of the carriers. Since three primary color components derived from detection of three modulated carriers should sum to the low frequency portion or luminance signal, an error signal proportional to the loss in camera resolution is derived by comparing this sum with the appropriately band-limited luminance signal. This error signal is used to control the common gain by which all of the carriers are amplified. Should the camera resolution decrease at the edges of the picture, for example, the carrier levels will drop, but the baseband luminance component of the output will be relatively unaffected. The resulting error signal increases the gain of the carrier channels, compensating for the reduced resolution of the camera. The proposed correction technique requires three modulated color carriers and a fourth independent but redundant video component to provide the monitoring capability.

A single-tube camera with three filters provides one environment appropriate for correction of resolution in accordance with the present invention. The camera may produce three frequency interleaved carriers or three frequency separated carriers. Alternatively, three striped filters could be arranged to produce a pair of interleaved carriers and a third carrier at a separated frequency. The amplitude correction of the present invention does not correct for hue shading with resolution variations. However, the hues produced by a three filter system are inherently influenced to a lesser degree by resolution than are those produced by a two filter system. If all three filters have identical spatial frequencies, the resulting balanced system will be free of such degradation.

DETAILED DESCRIPTION

Figure 1:
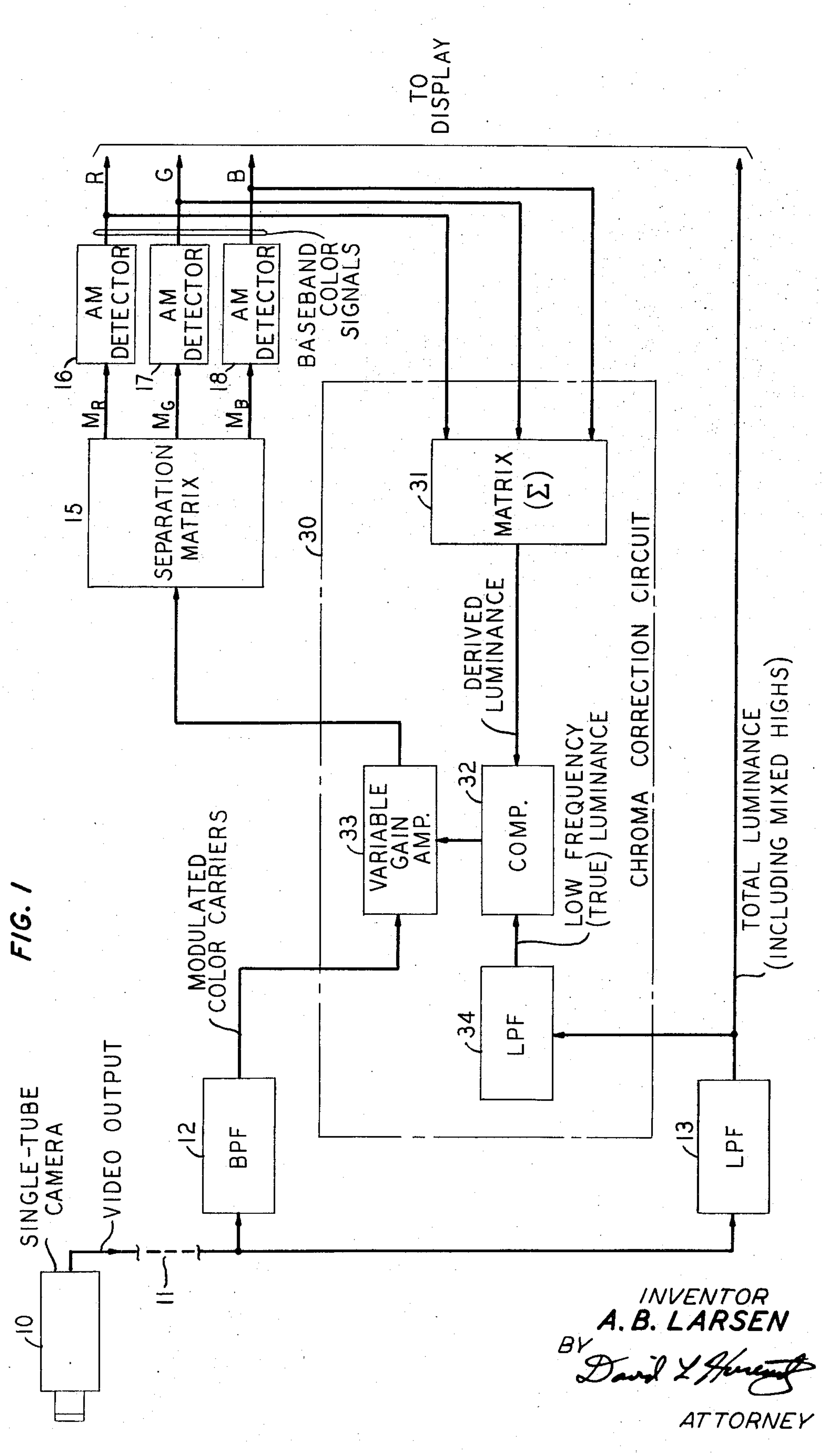
FIG. 1 is a block diagram of a color television system including the chroma correction circuit of the present invention.

The block diagram of FIG. 1 illustrates a color transmission system in which a camera output is processed and applied to a display. Chroma correction circuit 30 provides a unique correction of the amplitudes of the carrier-borne color components in accordance with the invention. The display is conventionally remote from the illustrated circuitry, separated by a transmission link, but additional transmission links could be provided elsewhere, such as at the output of camera 10 as indicated, for example, by 11. In PICTUREPHONE video telephone, the correction of camera resolution could be effected without a transmission link, but if link 11 represents a subscriber loop between the camera and the telephone central office, correction circuit 30 would correct for chroma error introduced by high frequency roll-off of the loop in addition to that generated by the camera resolution. The location of the transmission link, if any, does not, however, bear on the operation of the invention.

The video signal from camera 10 contains four independent components, a low frequency luminance component representing the brightness or intensity of the scene being televised, and three color or chroma components each modulated on a high frequency carrier. As used herein, chroma refers to signals containing color information, not to any specified combination of components, and chroma signals may contain luminance information as well as color information. The appropriate video output could be provided by a plurality of cameras or a multiple-tube camera in lieu of the single-tube camera illustrated. However, the correction provided by chroma correction circuit 30 is primarily directed, but not limited, to correction of the loss of the color components' amplitudes caused by the camera tube's loss of high frequency resolution. Such correction is useful only if the necessary four independent signals are produced by a single camera tube. Chroma correction for certain forms of transmission distortion could also be accomplished by chroma correction circuit 30, and the source of the video output will, of course, be irrelevant to this type of correction.

Chroma correction circuit 30 has been designed to automatically correct for a loss of camera resolution as would be provided by a single-tube camera having three striped color filters for spatially modulating the primary color images on the single target. These filters are formed by periodically repetitive stripes of materials which alternatively exhibit high and low transmission characteristics. Each grating provides low transmission for a different region of the visible spectrum (or color) and each resultant color image formed on the camera target is spatially modulated in a distinctive manner, the spatial frequency of each modulated image is dependent upon the grating density of the corresponding color filter. Each color component of the composite video output from the camera tube is modulated on a distinct carrier, whose frequency and phase are determined by the spatial orientation of the striped filter relative to the direction of the scan. The modulation on each carrier is proportional to the amplitude of the light from the scene within one region of the spectrum, and the total color content of the scene is contained in three independent carriers.

Figure 2:
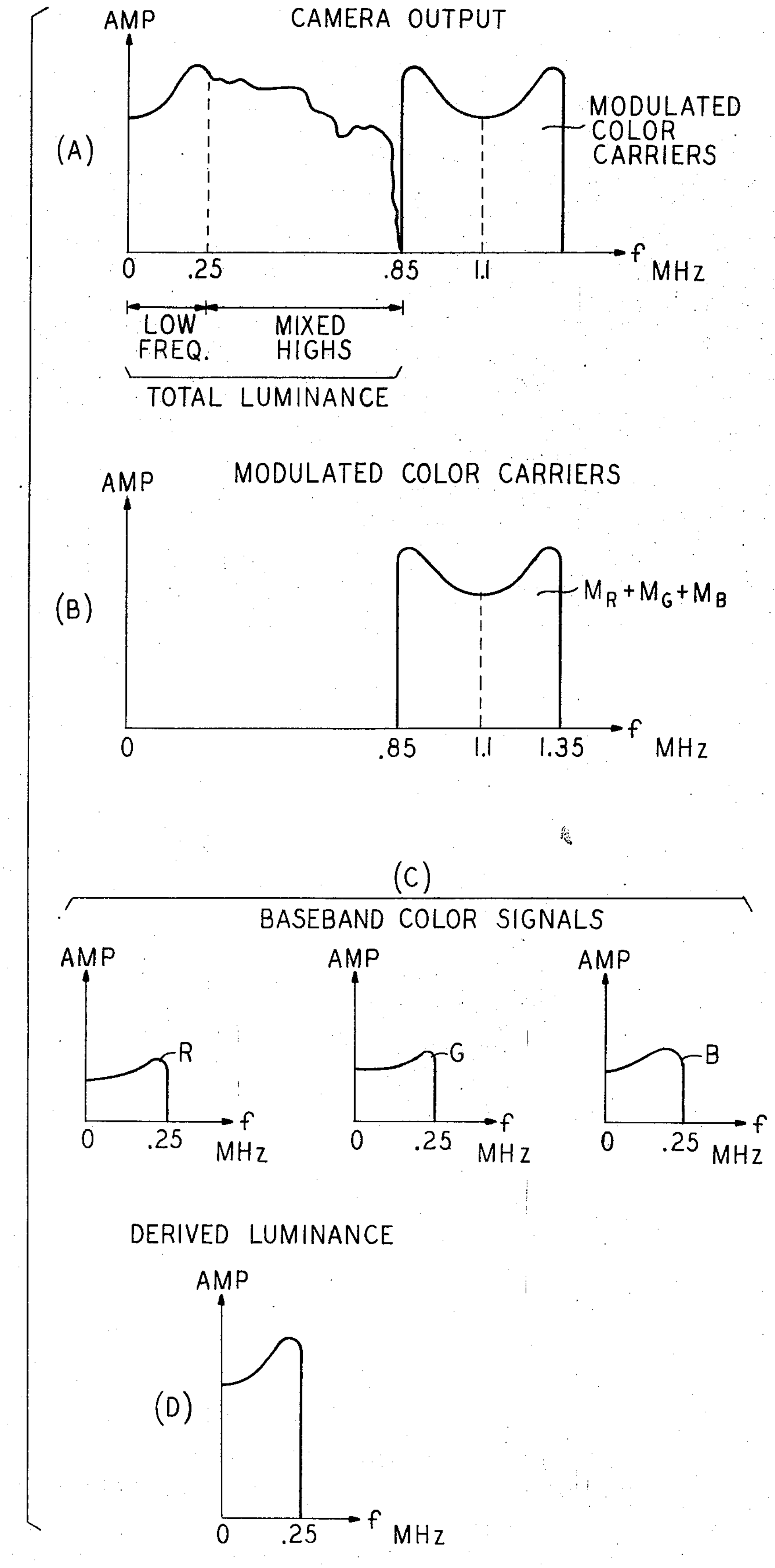
FIG. 2 graphically illustrates frequency spectra of signals at various points in the system of FIG. 1. The line structures of the spectra are not shown.

One specific embodiment using three striped color filters, preferably red, green and blue, is disclosed in the aforementioned copending application of this inventor. The frequency spectra of the camera output is represented without the internal line structure in FIG. 2A. The low frequency region of the camera output is the total luminance or monochrome signal and the high frequency region of the output consists of modulated color carriers, each containing the color information generated by one of three striped filters. The modulated color components may be interleaved and thus occupy a common frequency band as shown in FIG. 2A. This output is produced by the three filter configuration in which one is vertically oriented and two are tilted relative to the first, as disclosed in the aforementioned copending application. Alternatively, each of the modulated components may be separated in frequency as suggested in the aforementioned Kell patent. In addition, a combination of the interleaved and frequency separated carriers may also be utilized, such as by using two grating filters to interleave two color carriers, and a third grating filter oriented to provide a frequency separated carrier for the third chroma component.

The luminance signal and the modulated color carriers are each removed from the composite video output by appropriate bandpass filters. It is assumed for illustration that the color components are interleaved and that the frequencies of all of their carriers are substantially 1.1 MHz with sidebands extending from 0.85 to 1.35 MHz. Bandpass filter 12 passes one channel containing the modulated color carriers as shown in FIG. 2B. Of course, bandpass filter 12 may be tuned to a wider band if the color information is modulated on additional frequency separated carriers. Low-pass filter 13 is tuned to pass only a baseband channel containing the total luminance which consists of the low frequency and the so-called mixed highs, as shown in FIG. 2A.

In a conventional single-tube system, the modulated carriers are applied to separation matrix 15 which separates the three modulated carriers according to either their frequency or phase depending upon the form of optical modulation provided by the arrangement of the striped filters at the camera. If the Kell type optical system were used, matrix 15 would be a series of bandpass filters and would produce three modulated carriers $M_R$, $M_G$ and $M_B$, at different frequencies. If the optical system generated interleaved signals, matrix 15 would be an arrangement of comb filters capable of combing the spectra to produce the three carriers $M_R$, $M_G$ and $M_B$, each of which would have substantially the same carrier frequency. If the combination of frequency separated and interleaved carriers is used, matrix 15 would be an appropriate combination of bandpass and comb filters.

The modulated carriers $M_R$, $M_G$ and $M_B$ are detected by individual AM detectors 16–18, respectively, to produce baseband representations of three independent color components, conventionally the primary colors red, green and blue, designated R, G and B, respectively. These baseband signals, whose frequency spectra are illustrated in FIG. 2C, are applied to the display, together with the luminance signal from low-pass filter 13. The display reconstructs the image by combining the monochrome information on the luminance signal and the color information provided by the three baseband color signals.

A transmission loop may be provided prior to the display device, in which case appropriate conventional linear matrixing of the baseband color components and the luminance may be provided in order to facilitate transmission. However, the reconstructed image will not be an accurate duplicate of the original scene if distortion is introduced by either the camera or transmission equipment. One form of distortion results from the fact that the amplitude of each of the color signals is a function of system characteristics, such as the resolution of the camera tube in single-tube systems and the high frequency roll-off in any system transmitting the color information on high frequency carriers. It is this type of distortion, which affects all of the color components similarly, that is corrected by chroma correction circuit 30.

The loss of high frequency resolution in a single-tube color camera is one specific cause of a correctable distortion. The single-tube camera with striped color filters may exhibit changes in the amplitudes of the chroma components with resolution variation. If the spatial frequencies of the striped filters are all equal, any resolution variation will affect all components equally and thus eliminate the relative variations which may be manifested in the display as hue shading. Those variations common to all of the color components will, of course, cause distortion, but these common variations will be corrected by chroma correction circuit 30.

The resolution will affect the higher spatial frequency components of the image to a greater extent than it will affect the components of the lower spatial frequencies. The low frequency luminance signal is derived from the low spatial frequency components and thus, the low frequency luminance signal can serve as an amplitude datum to which the amplitudes of the color components derived from the high spatial frequency components can be referred.

Chroma correction circuit 30 is a feedback circuit that includes matrix 31 which forms a derived luminance signal by combining the three independent baseband color signals, red, green and blue, which were in turn derived from the high frequency color signals $M_R$, $M_G$ and $M_B$. If the three baseband signals represent red, green and blue, as illustrated by the three spectra in FIG. 2C, matrix 31 may be a conventional linear combiner which forms the instantaneous algebraic sum of the three components. The low frequency or true luminance, assumed for illustration to be from 0–0.25 MHz, is passed by low-pass filter 34, which thus rejects the mixed highs. The amplitude of the derived luminance is compared with the amplitude of the true low frequency luminance by comparator 32. The comparison yields a difference output which controls the gain of amplifier 33. Amplifier 33 is shown in a path common to all modulated color carriers, but individual controllable amplifiers located in the separated paths of the carriers subsequent to matrix 15, or in the paths of the baseband components at the outputs of detectors 16–18 may, of course, be substituted for single variable gain amplifier 33. However, the factor by which each of the color signals is amplified should be the same for all colors. In this manner, amplifier 33 multiplies each of the color components, (whether modulated on interleaved or frequency separated carriers) by a common controllable factor.

As the resolution of camera 10 falls (as for example with increased beam size at the edges of the scansion) the color components' amplitudes fall and their derived luminance representation falls proportionately. In accordance with the invention, the amplitudes of the color signals are adjusted by the variable gain amplifier to equalize them with the true low frequency luminance as indicated by correction circuit 30. This automatic procedure operates continuously on the instantaneous signals without in any way affecting the hue, and it does not introduce the saturation distortion that would occur if a common luminance factor were algebraically added to each color component as is the case in most prior art systems.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A color transmission system of the type having camera means for producing four independent video components, one of said components containing true luminance information and the other three of said components containing color information, CHARACTERIZED IN THAT, said system further includes a feedback correction circuit for automatically adjusting the amplitudes of the chroma components, said circuit comprising: means for monitoring the luminance component, means for monitoring the chroma components, means for combining the chroma components to form a representative luminance signal derived exclusively from said chroma components, means for amplifying each of said chroma components by a common variable gain factor, and feedback means for comparing the true luminance component and the representative luminance signal and controlling said variable gain factor so that the amplitudes of the true luminance component and the representative luminance signal are equalized.

2. A television system of the type having a single pickup tube; camera for generating a video output having a plurality of components including a low frequency luminance signal representative of the brightness of a scene and at least three modulated color carriers, the modulation on each carrier representing the amplitude of light from said scene within one region of the visible spectrum, and means for transmitting said plurality of video components, CHARACTERIZED IN THAT said transmitting means includes means for forming from said modulated color carriers color signals representative of the color content of said scene, means for deriving exclusively from said modulated color carriers a derived luminance signal, means for comparing the amplitudes of said derived luminance signal and said low frequency luminance signal, and means responsive to said comparison for controlling the gain factor by which each of said color signals is amplified to equalize the amplitudes of the derived and low frequency luminance signals.

3. A television system comprising, a camera having a single pickup tube for generating a video output having a low frequency signal representing the intensity of the scene being televised and a plurality of modulated color carriers, each carrier containing different color information of said scene, means for detecting each of said modulated color carriers to form from each a baseband color signal, means for combining said baseband signals to form a derived luminance signal, means for comparing said low frequency signal and said derived luminance signal to form an error signal representative of the difference between said signals, and means for amplifying exclusively each of said baseband color signals by a common gain factor to equalize the amplitudes of said low frequency signal and said derived luminance signal, said factor being controlled by said error signal.

4. A television system as claim in claim 3 wherein said plurality of modulated color carriers include three signals, each representing one primary color image of said scene.

5. A television system as claimed in claim 3 wherein said baseband signals represent red, green and blue color images of said scene, and said combining means sums said baseband signals to form the derived luminance signal.

6. A television system as claimed in claim 3 wherein at least two of said plurality of modulated color carriers are frequency interleaved and at a frequency above the frequency of said low frequency signal.

7. A television system as claimed in claim 3 wherein said means for amplifying each of said baseband color signals is a variable gain amplifier for adjusting the gain of the plurality of modulated color carriers.

8. A television system as claimed in claim 7 wherein said modulated color carriers are transmitted in a single channel containing said variable gain amplifier.

9. A television system as claimed in claim 3 wherein at least two of said plurality of modulated carriers occupy separated frequency bands above the frequency of said low frequency signal.

* * * * *